(12) United States Patent
Hirai et al.

(10) Patent No.: US 12,378,356 B2
(45) Date of Patent: Aug. 5, 2025

(54) METHOD FOR PURIFYING BRANCHED POLYETHYLENE GLYCOL

(71) Applicant: NOF CORPORATION, Tokyo (JP)

(72) Inventors: Midori Hirai, Kawasaki (JP); Kyu Takeuchi, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 495 days.

(21) Appl. No.: 17/788,841

(22) PCT Filed: Dec. 21, 2020

(86) PCT No.: PCT/JP2020/047603
§ 371 (c)(1),
(2) Date: Jun. 24, 2022

(87) PCT Pub. No.: WO2021/132123
PCT Pub. Date: Jul. 1, 2021

(65) Prior Publication Data
US 2022/0363824 A1   Nov. 17, 2022

(30) Foreign Application Priority Data

Dec. 27, 2019   (JP) .................................. 2019-237989

(51) Int. Cl.
*C08G 65/30*   (2006.01)

(52) U.S. Cl.
CPC .................................. *C08G 65/30* (2013.01)

(58) Field of Classification Search
None
See application file for complete search history.

(56) References Cited

U.S. PATENT DOCUMENTS

| | | |
|---|---|---|
| 2002/0120075 A1 | 8/2002 | Yasukohchi et al. |
| 2002/0165205 A1 | 11/2002 | Kubo et al. |
| 2005/0058620 A1 | 3/2005 | Nakamoto et al. |
| 2005/0288490 A1 | 12/2005 | Nakamoto et al. |
| 2006/0073113 A1 | 4/2006 | Nakamoto et al. |
| 2006/0115450 A1 | 6/2006 | Nakamoto et al. |
| 2009/0023859 A1 | 1/2009 | Sakanoue et al. |
| 2009/0192320 A1 | 7/2009 | Nakamoto et al. |
| 2010/0256325 A1 | 10/2010 | Yoshioka et al. |
| 2010/0261863 A1 | 10/2010 | Takehana et al. |
| 2010/0286361 A1 | 11/2010 | Yoshimura et al. |
| 2010/0292515 A1 | 11/2010 | Yamamoto et al. |
| 2011/0082277 A1 | 4/2011 | Nakamoto et al. |
| 2019/0309120 A1 | 10/2019 | Nobukuni et al. |

FOREIGN PATENT DOCUMENTS

| | | | | |
|---|---|---|---|---|
| CN | 102197125 A | 9/2011 | | |
| CN | 103270084 A | 8/2013 | | |
| CN | 107075027 A | 8/2017 | | |
| EP | 2657272 A1 * | 10/2013 | ............. | C08G 65/30 |
| JP | 11-335460 A | 12/1999 | | |
| JP | 2002-363278 A | 12/2002 | | |
| JP | 2004-197077 A | 7/2004 | | |
| JP | 2010-248504 A | 11/2010 | | |
| JP | 2010-254978 A | 11/2010 | | |
| JP | 2010-254981 A | 11/2010 | | |
| JP | 2010-254986 A | 11/2010 | | |
| JP | 2017-66478 A | 4/2017 | | |
| WO | 2006/088248 A1 | 8/2006 | | |
| WO | 2010/024470 A1 | 3/2010 | | |
| WO | WO-2012086016 A1 * | 6/2012 | ............. | C08G 65/30 |
| WO | 2018/128155 A1 | 7/2018 | | |

OTHER PUBLICATIONS

Communication issued on Aug. 24, 2023 by Intellectual Property India for Indian Patent Application No. 202247035813.
Communication issued on Sep. 12, 2023 by the China National Intellectual Property Administration for Chinese Patent Application No. 202080090780.7.
Oshima et al., Journal of Japan Coating Technology Association, vol. 22, No. 9, pp. 397-403, 1987 (Total 8 pages).
Mukaiyama, "The Reactions of Vinyl Ethers and Acetylenic Ethers," Synthetic Organic Chemistry, vol. 19, No. 1, pp. 29-46, 1961 (Total 19 pages).
International Search Report (PCT/ISA/210) dated Feb. 22, 2021, issued by the International Searching Authority in counterpart International Application No. PCT/JP2020/047603.
Written Opinion (PCT/ISA/237) dated Feb. 22, 2021, issued by the International Searching Authority in counterpart International Application No. PCT/JP2020/047603.
Search Report issued by European Patent Office on Dec. 21, 2023 in European Application No. 20904842.0.
Office Action dated Dec. 20, 2024, issued by Korean Patent Office in Korean Patent Application No. 10-2022-7021636.
Communication issued on Dec. 5, 2024 from the Japan Patent Office for Japanese Patent Application No. 2020-210993.

* cited by examiner

*Primary Examiner* — Christopher M Rodd
(74) *Attorney, Agent, or Firm* — Sughrue Mion, PLLC

(57) ABSTRACT

A method for purifying a branched polyethylene glycol, which includes adding, to a branched polyethylene glycol compound represented by the following formula [1] and having a weight average molecular weight of 40,000 or more:

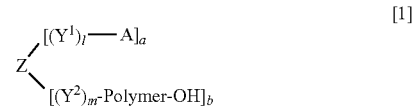

where Z, $Y^1$, $Y^2$, A, Polymer, l, m and b are as defined herein, at least one solid acid selected from magnesium silicate, aluminum silicate, and aluminum magnesium silicate and having a specific surface area of 50 to 250 m²/g in the presence of an aprotic organic solvent to obtain a mixture; stirring the mixture; and subsequently separating the solid acid.

1 Claim, 3 Drawing Sheets

METHOD FOR PURIFYING BRANCHED POLYETHYLENE GLYCOL

CROSS-REFERENCE TO RELATED APPLICATIONS

This application is a National Phase Entry of PCT International Application No. PCT/JP2020/047603, filed on Dec. 21, 2020, which claims priority to Japanese Patent Application No. 2019-237989, filed on Dec. 27, 2019, and which Japanese Patent Application No. 2019-237989 is incorporated herein by reference in its entirety.

TECHNICAL FIELD

The present invention relates to a method for purifying a polyethylene glycol compound used in pharmaceutical uses, for example. More specifically, the invention is a purification method for obtaining a branched polyethylene glycol compound that is suitable as a raw material of an activated polyethylene glycol for chemical modification uses in drug delivery systems.

The present invention is particularly suitable for pharmaceutical uses including modification of polypeptides, enzymes, antibodies, other low-molecular drugs, nucleic acid compounds such as genes and oligonucleic acids, nucleic acid medicaments, and other physiologically active substances or application to drug delivery system carriers such as liposomes, polymer micelles, and nanoparticles.

BACKGROUND ART

A polyethylene glycol (PEG) is widely known as a standard carrier in drug delivery systems and is a very useful and indispensable material. By modifying a drug such as a physiologically active substance or a liposome with a polyethylene glycol compound, capture of the drug by the reticular endothelial system (RES) and excretion thereof in the kidneys are suppressed due to the high hydration layer and the steric repulsion effect of the polyethylene glycol, so that it becomes possible to improve the circulation in blood of the drug and reduce the antigenicity thereof.

In recent years, in order to form a more widely effective hydration layer and to reduce enzymatic decomposition of a linker portion between the polyethylene glycol and the drug, drugs using a branched polyethylene glycol compound have been developed. Among them, a branched polyethylene glycol compound having a polyhydric alcohol as a basic backbone as shown in Patent Documents 1 and 2 does not have a linker such as an amide bond or a urethane bond, which may be decomposed in the living body, in the basic backbone. Therefore, the compound is less likely to be hydrolyzed into a single-stranded polyethylene glycol during the production process and in the body, and is highly stable and useful. In particular, a high-molecular-weight branched polyethylene glycol having a molecular weight of 40,000 or more is excellent in circulation in blood, and hence is particularly suitable for pharmaceutical modification uses.

FIG. 1 shows a method for producing a two-branched polyethylene glycol compound described in Patent Document 1 as an example of a method for producing a branched polyethylene glycol compound using a polyhydric alcohol as a basic backbone. According to this literature, after the polymerization of the polyethylene glycol, the hydroxyl group at the polymerization terminal is blocked by alkyl etherification.

However, depending on conditions for the polymerization of the polyethylene glycol, as shown in Non-Patent Literature 1, as thermal history increases with the progress of the polymerization, the hydroxyl group at the polymerization terminal is eliminated and a side reaction of conversion into a vinyl ether group is more likely to occur. In the case where this side reaction occurs, the branched polyethylene glycol compound after polymerization contains a polyethylene glycol compound having a vinyl ether group at the terminal as an impurity. This vinyl etherified terminal may remain unalkylated in the subsequent alkyl etherification step and may be converted into a hydroxyl group in the subsequent step. As a result, the target branched polyethylene glycol compound contains, as an impurity, a bifunctional polyethylene glycol compound having a hydroxyl group at the polyethylene glycol terminal in addition to the hydroxyl group as a modification site with a drug. The bifunctional polyethylene glycol compound causes dimerization of the drug when drug modification is performed, and it is difficult to separate and purify the main component and the dimerized compound after the drug modification. Therefore, a manufacturing technique for reducing the vinyl ether group in the polyethylene glycol compound has been strongly desired.

Non-Patent Literature 2 and Patent Literature 3 describe that a vinyl ether group is hydrolyzed under acidic conditions such as hard acid and converted into a hydroxyl group. However, in the case where a polyethylene glycol compound is treated under acidic aqueous solution conditions, a step of extraction into a large amount of an organic solvent is required after the treatment and the case is not efficient in view of solvent recovery Alternatively, in order to avoid the extraction operation, it is conceivable to add an acid until the inside of the system becomes acidic after the polymerization of ethylene oxide to convert the vinyl ether into a hydroxyl group in the polymerization tank. In this case, it is necessary to perform the treatment at high temperature to prevent solidification of the polyethylene glycol in the tank. However, quality of the high-molecular-weight branched polyethylene glycol compound tends to lower under high temperature and low pH conditions due to deterioration of the polyethylene glycol chain with time and decomposition at the branched portion.

Patent Literature 4 describes a method of separation and purification through physical adsorption of impurities having different numbers of hydroxyl groups from a polyoxyalkylene derivative using an adsorbent. However, in the branched polyethylene glycol compound, only the compound after alkyl etherification is described, and there is no description about the hydroxyl group-containing compound before alkyl etherification

PRIOR ART DOCUMENTS

Non-Patent Literatures

Non-Patent Literature 1: "Journal of Japan Coating Technology Association", Vol. 22, No. 9, p 397-403, 1987
Non-Patent Literature 2: "Synthetic Organic Chemistry", Vol. 19, No. 1, p 29-46, 1961

Patent Literatures

Patent Literature 1: JP-A-2004-197077
Patent Literature 2: JP-A-2010-254986
Patent Literature 3: JP-A-11-335460
Patent Literature 4: JP-A-2010-254978

SUMMARY OF INVENTION

Problem to be Solved by the Invention

As described above, although a branched polyethylene glycol compound having a reduced vinyl ether group is an important material in pharmaceutical uses, the compound has not been obtained by an industrially easy method and there exist many problems.

An object of the present invention is to produce a high-purity branched polyethylene glycol compound having a reduced vinyl ether group terminal with high efficiency and good purity by an industrially practicable method.

Means for Solving the Problem

As a result of extensive studies to solve the above problems, the present inventors have found a purification method of treating a branched polyethylene glycol compound with a solid acid in an organic solvent to convert a vinyl ether group into a hydroxyl group and thereby achieving the reduction.

That is, the present invention is as shown below
(1) A method for purifying a branched polyethylene glycol, the method comprising adding, to a branched polyethylene glycol compound represented by the following formula [1] and having a weight average molecular weight of 40,000 or more:

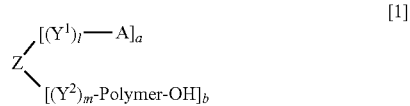

[1]

(in the formula [1],
Z is a residue obtained by removing, from a compound having 3 to 5 active hydrogen groups, the active hydrogen groups;
$Y^1$ and $Y^2$ each independently represent an alkylene group having 1 to 12 carbon atoms;
A represents a protecting group for an active group selected from the group consisting of a hydroxyl group, a carboxyl group, an amino group, and a thiol group;
Polymer represents a polyethylene glycol chain;
l is 0 or 1;
m is 0 or 1; and
a and b are integers satisfying $1 \leq a \leq 3$, $2 \leq b \leq 4$, and $3 \leq a+b \leq 5$), at least one solid acid selected from the group consisting of magnesium silicate, aluminum silicate, and aluminum magnesium silicate and having a specific surface area of 50 to 250 m$^2$/g in the presence of an aprotic organic solvent to obtain a mixture; stirring the mixture; and subsequently separating the solid acid.

Effects of Invention

According to the present invention, a vinyl ether group of an impurity contained in a branched polyethylene glycol compound can be converted into a hydroxyl group under mild conditions by treatment in a solid acid. Therefore, the purification method of the present invention can easily provide a high-quality polyethylene glycol compound suitable for pharmaceutical uses, on an industrial scale.

EMBODIMENTS FOR CARRYING OUT THE INVENTION

Figure 1:
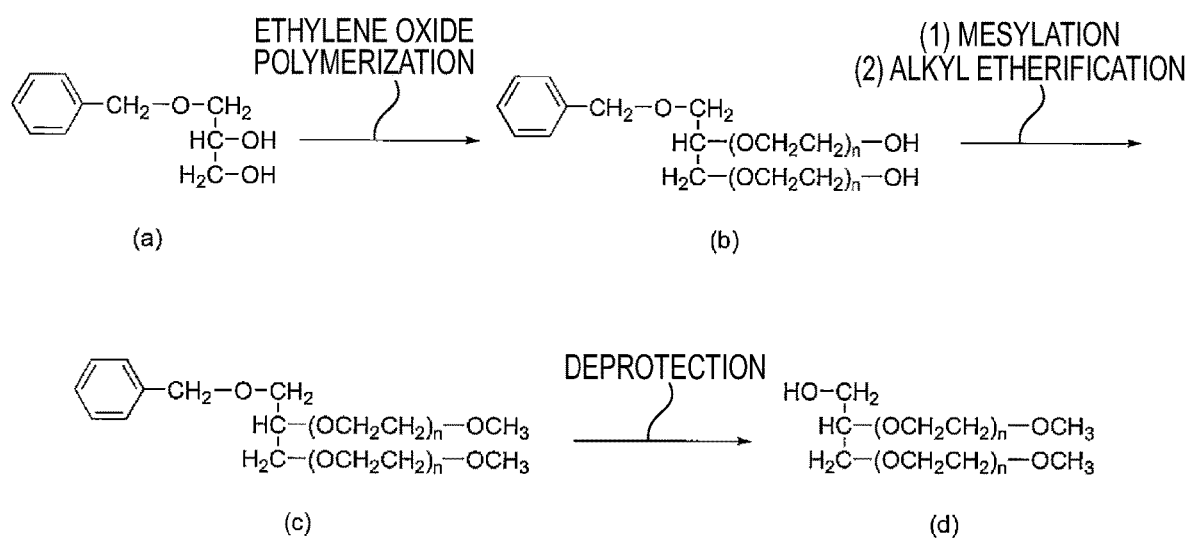
FIG. 1 is a production scheme of the branched polyethylene glycol compound shown in Patent Literature 1.
Figure 2:
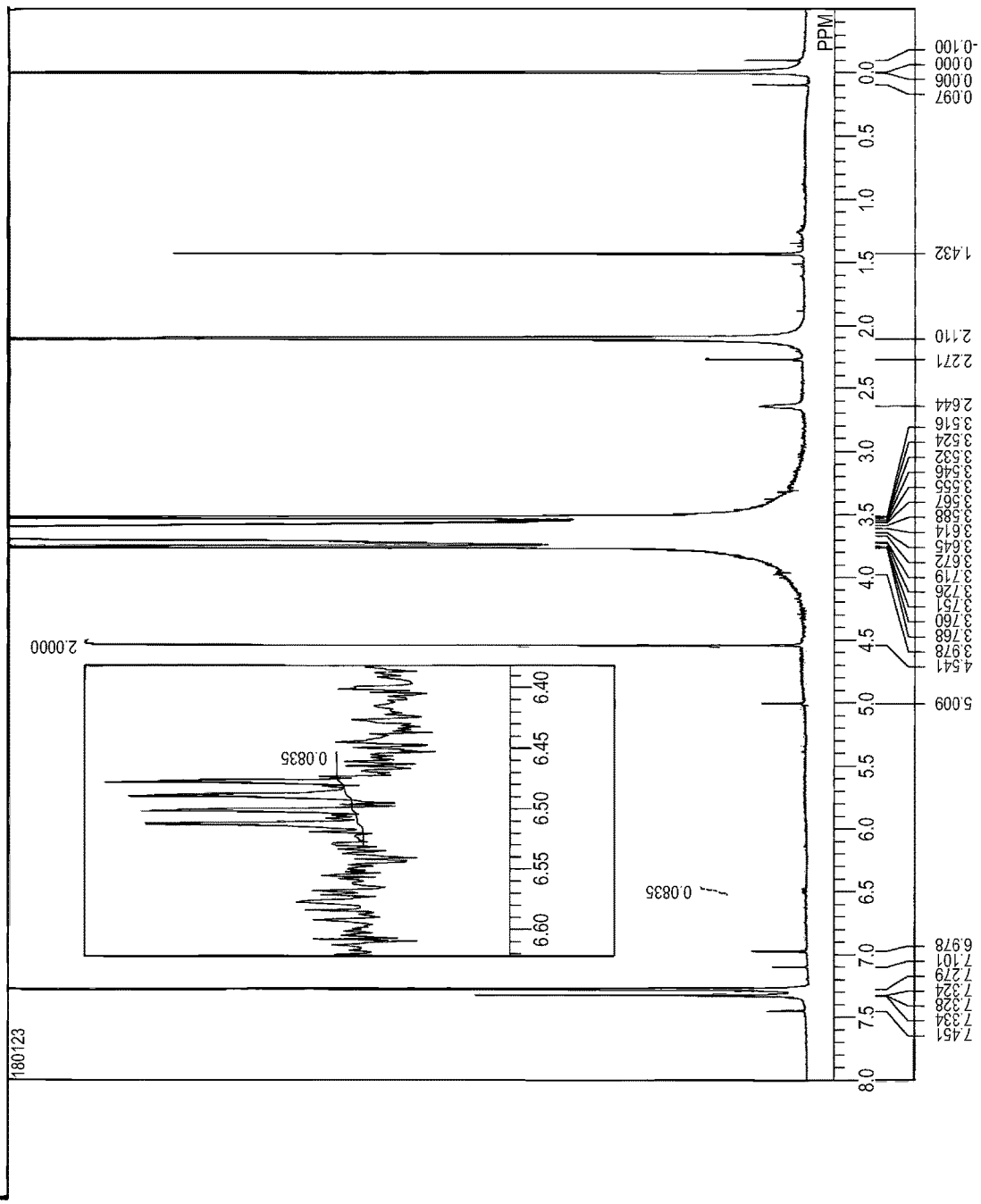
FIG. 2 is a $^1$H-NMR chart showing the content of the vinyl ether compound in the compound (iii) of Example 1-1.
Figure 3:
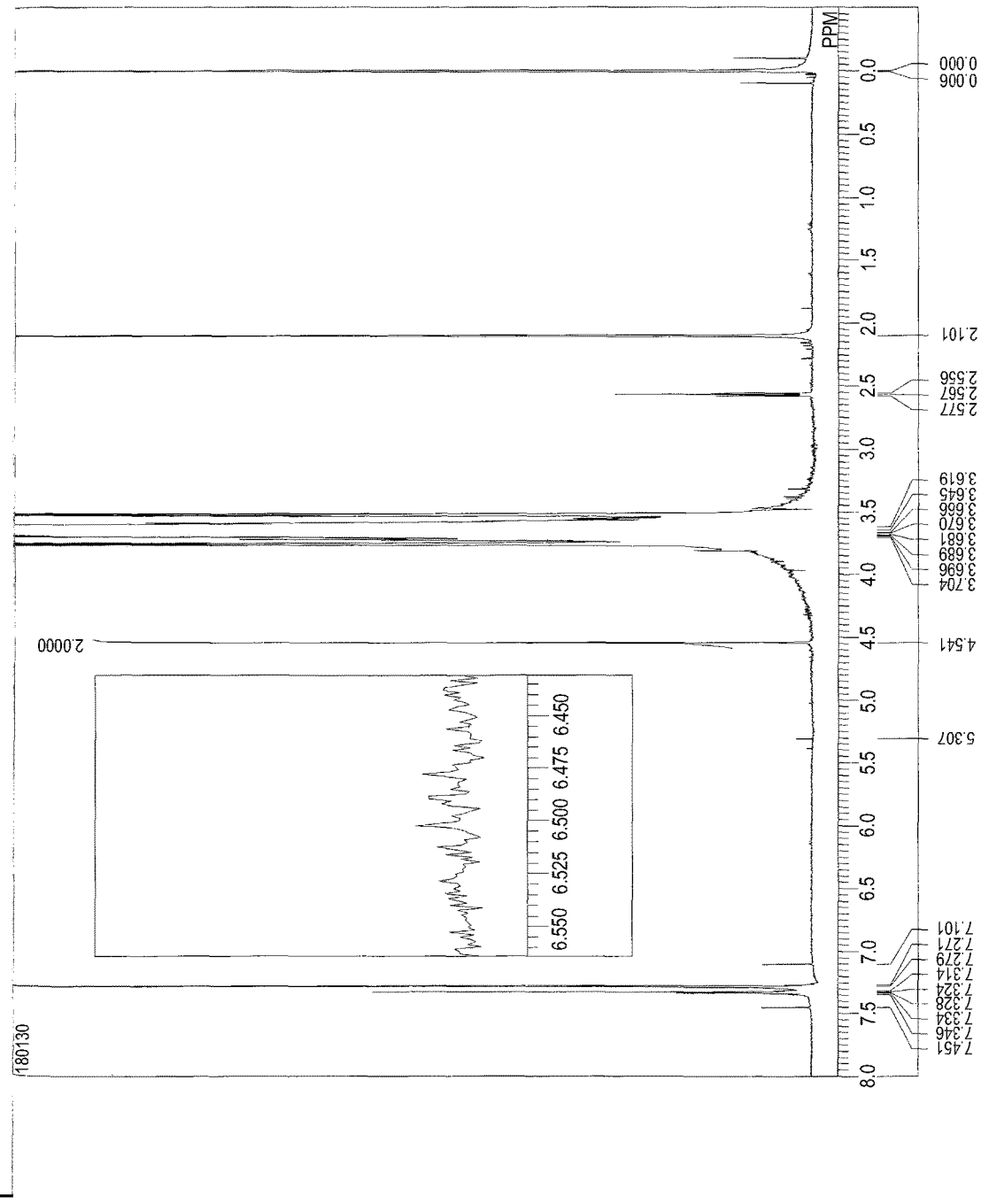
FIG. 3 is a $^1$H-NMR chart showing the content of the vinyl ether compound in the compound (iii) after the Kyoward 700 treatment in Example 1-2.

Hereinafter, the present invention will be described in detail. The present invention is specifically a method for purifying a polyethylene glycol compound represented by the general formula [1].

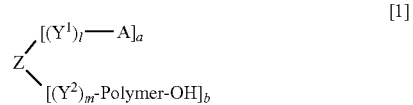

[1]

In the formula [1], Z is a residue obtained by removing, from a compound (Z(GH)n (n=3 to 5)) having 3 to 5 active hydrogen groups (GH), the active hydrogen groups (GH)n.

The active hydrogen group (GH) means a functional group containing active hydrogen H. As the active hydrogen group (GH), a hydroxyl group (OH) is particularly preferable. Specific examples of the compound (Z(GH)n (n=3 to 5)) having 3 to 5 active hydrogen groups (GH) include compounds, for example, polyhydric alcohols such as glycerin, diglycerin, triglycerin, trimethylolpropane, pentaerythritol, and xylitol, and alkanolamines such as triethanolamine, N,N,N',N'-tetrakis(2-hydroxyethyl)ethylenediamine, and glycerin, xylitol, and pentaerythritol are preferable.

$Y^1$ and $Y^2$ are a bonding group between Z and A and a bonding group between Z and Polymer, respectively and are each an alkylene group having 1 to 12 carbon atoms. As specific alkylene groups, there may be mentioned a methylene group, an ethylene group, a propylene group, an isopropylene group, a butylene group, an isobutylene group, a pentylene group, an isopentylene group, a hexylene group, a heptylene group, an octylene group, a nonylene group, a decylene group, an undecylene group, a dodecylene group, and the like, which may be branched. Further, the carbon number of each of $Y^1$ and $Y^2$ is more preferably 1 or more, and further preferably 4 or less.

A is a protecting group that protects an active group selected from the group consisting of a hydroxyl group, a carboxyl group, an amino group, and a thiol group.

The protecting group is, for example, described in "Protecting Groups in Organic Synthesis", Theodora W. Greene and Peter G. M. Wuts, published by John Wiley & Sons Inc. The protecting group is preferably a protecting group that can withstand the ethylene oxide polymerization reaction conditions, and may extend over a plurality of residues in Z. When the active group is a hydroxyl group, as the protective group for the hydroxyl group, there may be mentioned a benzyl group, a THP group (tetrahydropyranyl group), a t-butyl group, a triphenylmethyl group, a methylenedioxy group, a benzylidene acetal group, and an isopropylidene group. When the active group is a carboxyl group, as the protecting group for the carboxyl group, ortho esters such as 2,6,7-trioxabicyclo[2.2.2]octyl group (OBO ester) may be mentioned. When the active group is an amino group, as the protecting group for the amino group, a tosyl group, a THP group, a triphenylmethyl group, and a benzyl group may be mentioned. When the active group is a thiol group, as the protecting group for the thiol group, a benzyl group and a t-butyl group may be mentioned. Of these, the protecting groups for the hydroxyl group are preferable, and the benzyloxy group is more preferable.

Polymer is a linear or branched polyethylene glycol chain. The branched polyethylene glycol chain is a polyethylene glycol chain that is branched into two or more chains via a linker in the middle, and may have a plurality of branching points. An example is a polyethylene glycol chain having a polyhydric alcohol such as glycerin as shown in the following formula (i) as a branching point and branching into two or more chains.

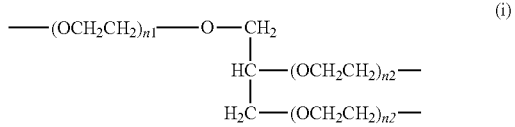

(i)

wherein n1 and n2 are each 1 to 1000, preferably 100 to 1000.

The weight-average molecular weight of the polyethylene glycol compound is 40,000 or more, preferably 60000 or more. The formation of the by-product vinyl ether group during polymerization varies depending on the temperature and the type and amount of the catalyst, but the by-product formation may start at 40,000 or more, and tends to increase as the molecular weight increases.

Further, there is no particular upper limit on the weight-average molecular weight of the polyethylene glycol compound, but it is frequently 100000 or less.

l equals 0 or 1, m equals 0 or 1, and a and b are integers satisfying $1 \leq a \leq 4$, $2 \leq b \leq 4$, and $3 \leq a+b \leq 5$.

Production Example of Compound of Formula [1]

The compound of formula [1] can be produced, for example, as follows.

The compound represented by the following formula [2] is reacted with ethylene oxide in the presence of an alkaline catalyst to achieve polymerization, and then an inorganic acid is added until the pH becomes in the range of 6 to 8 to neutralize the alkaline catalyst.

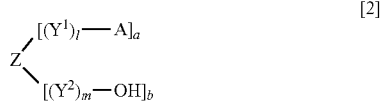

[2]

(in the formula [2], Z, $Y^1$, $Y^2$, A, l, m, a, and b are the same as described above.)

The alkaline catalyst is not particularly limited, and there may be mentioned metallic sodium, metallic potassium, sodium hydride, potassium hydride, sodium hydroxide, potassium hydroxide, sodium methoxide, potassium methoxide, and the like. The concentration of the alkaline catalyst is preferably 50 to 150 mol %. When it is less than 50 mol %, the polymerization reaction rate of the alkylene oxide is slowed down, and as a result, thermal history increases and side reactions such as terminal vinyl etherification occur, so that the quality of the target product tends to lower. When it exceeds 150 mol %, the viscosity of the reaction solution increases or the solution solidifies during the alcoholation reaction and stirring efficiency lowers, so that the alcoholation tends not to be promoted.

Prior to the ethylene oxide polymerization, in order to suppress the formation of the by-product polyethylene glycol compound derived from water, after an organic solvent is added, azeotropic dehydration may be performed to lower the water content in the system. The organic solvent for the azeotropic dehydration is not particularly limited, and methanol, ethanol, toluene, benzene, and xylene may be mentioned, but toluene having a boiling point close to that of water is preferable. The azeotropic temperature is preferably 50 to 130° C. When the temperature is lower than 50° C., the viscosity of the reaction solution increases and water tends to remain. When the temperature is higher than 130° C., a condensation reaction may occur. In the case where water remains, it is preferable to repeat the azeotropic dehydration.

The polymerization of ethylene oxide is carried out without solvent or in a solvent. The reaction solvent is not particularly limited as long as it is an aprotic solvent such as toluene, benzene, xylene, acetonitrile, ethyl acetate, tetrahydrofuran, chloroform, methylene chloride, dimethyl sulfoxide, dimethylformamide, or dimethylacetamide, but toluene or no solvent is preferable. The reaction time is preferably 1 to 24 hours. When it is shorter than 1 hour, the reaction may not be completed. When it is longer than 24 hours, the above-mentioned decomposition reaction may occur.

The polymerization temperature is preferably 50 to 130° C. When the temperature is lower than 50° C., the polymerization reaction rate is low and thermal history increased, so that the quality of the compound represented by the formula [1] tends to lower. When the temperature is higher than 130° C., side reactions such as terminal vinyl etherification occur during the polymerization, and the quality of the target product tends to lower. Since the viscosity of the reaction solution increases as the molecular weight increases during the polymerization, an aprotic solvent, preferably toluene, may be added as needed.

As the inorganic acid used for neutralizing the alkaline catalyst after the polymerization, hydrochloric acid, phosphoric acid, sulfuric acid, nitric acid, sulfurous acid and the like may be mentioned, and phosphoric acid is preferable. As the amount to be added, the acid is added so as to achieve pH 6 to 8. When the pH is less than 6, decomposition may occur between Z and Polymer. When the pH is higher than 8, since neutralization is not completed, the solid acid to be added later may be inactivated and vinyl ether elimination may not proceed sufficiently. The neutralization temperature is preferably 90 to 130° C. When the temperature is lower than 90° C., the viscosity of the polyethylene glycol compound increases and the stirring efficiency lowers, so that the acid concentration locally increases and decomposition may occur between Z and Polymer. Further, when the temperature is higher than 130° C., the oxidative deterioration of the polyethylene glycol compound is promoted, and the polydispersity tends to increase.

(Treatment with Solid Acid)

By adding at least one solid acid selected from the group consisting of magnesium silicate, aluminum silicate, and aluminum magnesium silicate having a specific surface area of 50 to 250 m$^2$/g to the compound represented by the formula [1] in the presence of an aprotic organic solvent, a vinyl ether group is converted into a hydroxyl group to purify an impurity having a vinyl ether group.

The impurity having a vinyl ether group is one in which a part of the polyethylene glycol terminal is replaced with a vinyl ether group, and specifically, has a structure represented by the following formula (ii).

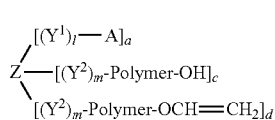

(in the formula, Z, $Y^1$, $Y^2$, A, Polymer, l, m, and a are the same as described above and $0 \leq c \leq 3$, $1 \leq d \leq 4$ and $3 \leq a+c+d \leq 5$ are satisfied.)

The aprotic solvent is a solvent lacking acidic hydrogen and has no proton donating property. The solvent is desirably a solvent having a low polarity and a high solubility of the polyethylene glycol compound. As the aprotic organic solvent, there may be mentioned toluene, xylene, benzene, ethyl acetate, butyl acetate, chloroform, dichloromethane, acetone, acetonitrile, tetrahydrofuran, and the like, and the aprotic organic solvent is preferably toluene or ethyl acetate, more preferably toluene. A protic solvent and a highly polar solvent is not preferable because a metal component may be eluted from the solid acid.

The amount of the solvent is preferably 5 times by weight or more with respect to the polyethylene glycol compound represented by the formula [1]. When the amount is less than 5 times by weight, the reaction efficiency is deteriorated owing to high viscosity of the solution and the yield is also deteriorated, so that the amount is advantageously 5 times by weight or more in view of production. Even when the amount of the solvent is 30 times by weight or more, the reaction efficiency does not change and is good, but in the subsequent filtration operation, the volume to be processed increases, the man-hours increase, and the yield decreases, so that the case is disadvantageous in terms of cost. For these reasons, the amount of the solvent is preferably 5 to 20 times by weight, more preferably 7 to 15 times.

The polyethylene glycol compound is dissolved using the above solvent. With regard to the order of charging into the treating vessel, either the polyethylene glycol compound or the aprotic organic solvent may be first charged. Heating may be required depending on the molecular weight of the polyethylene glycol compound, and the method for heating is not particularly limited, but in general, the compound can be dissolved by heating to 30° C. or higher.

As the solid acid, there is used a solid acid which is at least one selected from the group consisting of magnesium silicate, aluminum silicate and aluminum magnesium silicate, and has a specific surface area of 50 to 250 $m^2/g$. A solid acid having a larger specific surface area is more effective as the solid acid for converting a vinyl ether group into a hydroxyl group. However, the filtration rate decreases at the time of filtering out the solid acid from the solution and thereby productivity is lowered, so that the above range is preferable. From this point of view, the specific surface area of the solid acid is more preferably 100 $m^2/g$ or more and more preferably 200 $m^2/g$ or less.

As magnesium silicate, there may be mentioned those having an $MgO/SiO_2$ ratio ranging from 10/90 to 30/70, specifically, synthetic magnesium silicates such as Kyoward 600 (manufactured by Kyowa Chemical Industry Co., Ltd.) and Tomita AD600 (manufactured by Tomita Pharmaceutical Co., Ltd.). As aluminum silicate, there may be mentioned those having an $Al_2O_3/SiO_2$ ratio ranging from 10/90 to 25/75, specifically synthetic aluminum silicates such as Kyoward 700 (manufactured by Kyowa Chemical Industry Co., Ltd.), Tomita AD700 (manufactured by Tomita Pharmaceutical Co., Ltd.), and silica alumina (manufactured by Catalyst Kasei Kogyo Co., Ltd.). The solid acids may be used alone or in combination. Preferably, it is a synthetic aluminum silicate.

The amount of the solid acid is preferably in the range of 0.2 to 1 times by weight with respect to the polyethylene glycol compound represented by the formula [1]. When it is less than 0.2 times by weight, the vinyl ether cannot be sufficiently decomposed, and when it is more than 1 time by weight, the polyethylene glycol compound remains in the filtered cake at the time of filtering the slurry solution after treatment, and the yield lowers. Therefore, it is preferably 0.2 to 1.0 times by weight, more preferably 0.3 to 1.0 times by weight.

The treatment temperature is preferably 25 to 60° C. At a temperature lower than 25° C., the viscosity of the solution is high and the purification efficiency is deteriorated. Further, since crystals may precipitate depending on the structure and molecular weight of the polyethylene glycol compound, the temperature is preferably 25° C. or higher. A preferable temperature range is 40 to 60° C.

The treatment time is not particularly limited, but is preferably between 30 minutes and 12 hours, and more preferably 1 to 3 hours. Further, the atmosphere in which this operation is performed is not particularly limited, but preferably, for the purpose of minimizing oxidation, the treatment can also be performed in the presence of an inert gas such as nitrogen. Moreover, the apparatus is not particularly limited, but the treatment can also be performed in a pressure-resistant vessel in consideration of operation under nitrogen and in a closed state where oxidative deterioration is unlikely to occur.

The method for removing the solid acid is not particularly limited, but generally, the solid acid is removed by filtration under reduced pressure or filtration under pressure. At this time, the filter is desirably heated to around the treatment temperature in advance, for the purpose of preventing crystal precipitation owing to temperature lowering during filtration.

The treatment step after the removal of the solid acid is not particularly limited, but typically, the polyethylene glycol compound can be isolated by cooling the solution containing the polyethylene glycol compound or adding a hydrocarbon such as hexane or cyclohexane, or a higher alcohol such as isopropanol, or an ether such as diethyl ether or methyl tert-butyl ether as a poor solvent to crystallize the polyethylene glycol compound, filtering it out, and then drying it. Moreover, the isolation is also possible through removal of the solvent and drying and solidification of the polyethylene glycol compound. Further, when the organic solvent used does not inhibit the subsequent reaction, the solution containing the polyethylene glycol compound can be used as it is for the next alkyl etherification reaction without the operations of crystallization and solvent removal. In the case where strict water content control is required prior to this reaction operation, additionally, the solution containing the polyethylene glycol compound can be dehydrated, typically by using a dehydrating agent such as magnesium sulfate or sodium sulfate or by azeotropically distilling the solvent.

The compound of the formula [1] thus obtained is a branched polyethylene glycol compound containing substantially no vinyl ether group. Since the compound of the formula [1] substantially contain no vinyl ether group, a high-purity polyethylene glycol compound having a low content of a bifunctional polyethylene glycol compound can be obtained in the subsequent steps. In the case where the content of the vinyl ether group is high in the polyethylene glycol compound, the bifunctional polyethylene glycol compound may be increased in the subsequent steps and when a drug is modified, the compound causes dimerization of the drug, so that there is a possibility of causing a problem.

EXAMPLES

Hereinafter, the present invention will be described in more detail based on Examples.

In Examples, for quantitative determination of the vinyl ether content in the compounds in Examples, $^1$H-NMR was used. Further, TOF-MS was used for measuring the molecular weight of a polyethylene glycol compound.

<Method for Quantitative Determination of Vinyl Ether Group Content>

In $^1$H-NMR analysis, JNM-ECP400 manufactured by JEOL Datum Co., Ltd. was used, and deuterated chloroform was used as a deuterated solvent. When the integral value of the benzyl-position proton (4.5 ppm, q, 2H) of a polyethylene glycol compound was set to 2, "Integral value of peak (6.5 ppm, q) of vinyl ether group×100" was regarded as the vinyl ether group content (%).

<Analytical Method of TOF-MS>

For the molecular weight measurement, TOF-MS (autoflex III manufactured by Bruker) was used, and the measurement was performed using Dithranol as a matrix, and using sodium trifluoroacetate as a salt. For the analysis, FlexAnalysis was used, and the molecular weight distribution was analyzed on Polytools. The obtained centroid value was described as the value of the molecular weight.

Example 1-1

Into a 5 L autoclave were charged 18.2 g (0.1 mol) of 3-benzyloxy-1,2-propanediol, 87 g of dehydrated toluene, and 4 g (18.2 mmol) of a 28% methanol solution of sodium methoxide, followed by dissolving them at room temperature. After 87 g of dehydrated toluene was charged, alcoholation was carried out while removing methanol/toluene at 60° C. under reduced pressure. After the alcoholation, 174 g of dehydrated toluene was added, the inside of the system was replaced with nitrogen, the temperature was raised, and 1982 g (45.0 mol) of ethylene oxide was added at 80 to 120° C. under a pressure of 1 MPa or less, followed by continuing the reaction for another 1 hour. About 1000 g of the obtained reaction product was taken out, 2000 g (45.5 mol) of ethylene oxide was added at 80 to 130° C. under a pressure of 1 MPa or less, and then the reaction was continued for another 1 hour. The entire content was taken out, the pH was adjusted to 7.5 with an 85% aqueous phosphoric acid solution, and 0.75 g of BHT (dibutylhydroxytoluene) was added to obtain a compound represented by the formula (iii).

TOF-MS analytical value (centroid value of molecular weight): 58,663

As a result of NMR analysis, the vinyl ether group content in the compound represented by the formula (iii) was 13%.

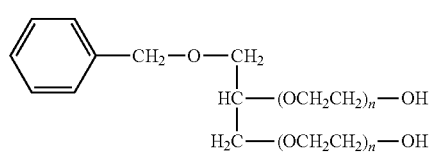

(iii)

Example 1-2

The polyethylene glycol represented by the formula (iii) (molecular weight: 60,000, vinyl ether content: 13%): 450 g and toluene: 3600 g were charged into a 10 L four-necked flask equipped with a mechanical stirring apparatus, a thermometer, and a nitrogen blowing tube and dissolved at 55° C. using a mantle heater. Thereto, 180 g of Kyoward 700 (manufactured by Kyowa Chemical Industry Co., Ltd.) dispersed in 900 g of toluene was added. After stirring at 55° C. for 2 hours under nitrogen conditions, filtration was performed and a filtrate was collected. Hexane was added to the filtrate, and precipitated crystals were collected by filtration and dried under vacuum. As a result of NMR analysis, the vinyl ether group content in the polyethylene glycol compound represented by the formula (iii) was N.D.

Comparative Examples 1-1, 1-2, and 1-3

The same operations were performed as in the method of Example 1-2 except that Kyoward 700, which is aluminum silicate, was changed to Kyoward 200, which is an amphoteric oxide (manufactured by Kyowa Chemical Industry Co., Ltd.: $Al_2O_3$), Kyoward 300 (manufactured by Kyowa Chemical Industry Co., Ltd.: $2.5MgO \cdot Al_2O_3 \; 0.7CO_3 \cdot nH_2O$) showing solid basicity, or Kyoward 1000 (manufactured by Kyowa Chemical Industry Co., Ltd.: $Mg_{4.5}Al_2(OH)_{13}(CO_3) \cdot 3.5H_2O$). Table 1 shows the results.

TABLE 1

| Run | Example 1-2 | Comparative Example 1-1 | Comparative Example 1-2 | Comparative Example 1-3 |
|---|---|---|---|---|
| Kyoward species | 700 | 200 | 300 | 1000 |
| Vinyl ether group content (%) | N.D. | 11 | 12 | 12 |

As described above, the reduction effect of the vinyl ether group was not observed in the case where a solid acid such as aluminum silicate was not used.

Comparative Example 2

The branched polyethylene glycol represented by the formula (iii) obtained in Example 1-1 (molecular weight: 60,000, vinyl ether content: 13%): 30 g and toluene: 300 g were charged into a 1 L four-necked flask equipped with a mechanical stirring apparatus, a thermometer, and a nitrogen blowing tube and dissolved at 55° C. using a mantle heater. After 30 mg of BHT was added to the treatment solution, the mixture was heated under reflux at 120° C. to azeotropically remove water. After cooling to room temperature, 0.13 g (1.3 mmol) of triethylamine and 0.12 g (1.1 mmol) of methanesulfonyl chloride were added, and reacted at 40° C. for 3 hours. Next, 0.85 g (4.4 mmol) of a 28% methanol solution of sodium methoxide was added, and reacted at 40° C. for 3 hours. After the reaction, the pressure was reduced while the reaction solution was kept at 40° C., the methanol/toluene mixed solution was removed, and then filtration was performed to collect a filtrate. After 30 mg of BHT was added to the treatment solution, the mixture was heated under reflux at 120° C. to azeotropically remove water.

After cooling to room temperature, 0.13 g (1.3 mmol) of triethylamine and 0.12 g (1.1 mmol) of methanesulfonyl chloride were added, and reaction was carried out at 40° C. for 3 hours. Next, 0.85 g (4.4 mmol) of a 28% methanol solution of sodium methoxide was added, and reaction was carried out at 40° C. for 3 hours. After the reaction, the pressure was reduced while the reaction solution was kept at 40° C., the methanol/toluene mixed solution was removed, and then filtration was performed to collect a filtrate. The solution was washed twice with 90 g of a 25% saline solution, concentrated, and dehydrated on magnesium sulfate, and then crystallization was performed with hexane. The precipitated crystals were collected by filtration and dried to obtain 26 g of a methoxylated compound of the formula (iv) (yield 85%).

As a result of NMR analysis, the vinyl ether group content in the methoxylated compound represented by the formula (iv) was 13% and no change was observed.

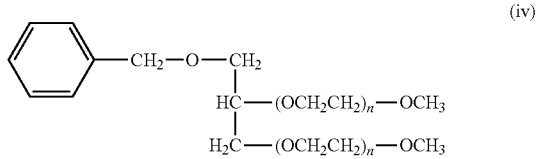

(iv)

From the above results, when the solid acid treatment was not performed, the vinyl ether group did not disappear and remained even after the methoxylation step. In the case where the vinyl ether group remains, a bifunctional polyethylene glycol compound may be increased in the subsequent steps and when a drug is modified, the compound causes dimerization of the drug, so that there is a possibility of causing a problem.

Example 2-1

Into a 100 L reaction vessel were charged 0.73 kg of 2,2-bis{2-(benzyloxy)ethoxymethyl}-1,3-propanediol, 72.5 g of a 28% methanol solution of sodium methoxide, and 45 kg of dehydrated toluene, and the inside of the system was replaced with nitrogen. After the temperature was raised to 50° C., the pressure was gradually reduced while maintaining the temperature, and about 9 kg of methanol and toluene were removed by distillation while blowing nitrogen. After the removal by distillation was continued for 1 hour, the inside of the system was again replaced with nitrogen, the temperature was raised to 100° C., 8.5 kg of ethylene oxide was added at 100 to 130° C. under a pressure of 1 MPa or less, and then the reaction was continued for another 3 hours. After taking out 30 kg from the vessel, about 15 kg of the reaction solution remaining in the vessel was heated to 120° C., 9.0 kg of ethylene oxide was pressed therein at 100 to 130° C. under a pressure of 1 MPa or less, and the reaction was continued for another 4 hours. After taking out 12 kg from the vessel, about 12 kg of the reaction solution remaining in the vessel was heated to 120° C., 6.2 kg of ethylene oxide was pressed therein at 100 to 130° C. under a pressure of 1 MPa or less, and the reaction was continued for another 8 hours. The entire content was taken out, and the pH was adjusted to 7.5 with an 85% aqueous phosphoric acid solution to obtain the following compound (v).

TOF-MS analytical value (centroid value of molecular weight): 40,929

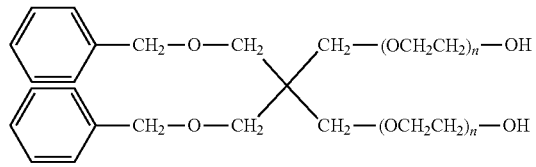

(v)

Example 2-2

The polyethylene glycol represented by the formula (v) (molecular weight: 40,000, vinyl ether content: 7%): 250 g and toluene: 2250 g were charged into a 5 L four-necked flask equipped with a mechanical stirring apparatus, a thermometer, and a nitrogen blowing tube and dissolved at 55° C. using a mantle heater. Thereto, 100 g of Kyoward 700 (manufactured by Kyowa Chemical Industry Co., Ltd.) dispersed in 250 g of toluene was added. After stirring at 55° C. for 2 hours under nitrogen conditions, filtration was performed and a filtrate was collected. Hexane was added to the filtrate, and precipitated crystals were collected by filtration and dried under vacuum. As a result of NMR analysis, the vinyl ether group content in the polyethylene glycol compound represented by the formula (v) was N.D.

Example 3-1

Into a 100 ml beaker containing 23.7 g of methanol and 6.8 g of water was charged 3.4 g of potassium hydroxide, which was dissolved at room temperature. After dissolution, the prepared potassium hydroxide solution and 18.0 g (0.07 mol) of 1-benzylxylitol were added to a 5 L autoclave. After stirring at room temperature for 15 minutes, 180 g of toluene was added, and the mixture was stirred while blowing nitrogen at 100 to 110° C., thereby removing water and methanol through toluene azeotropic distillation. The inside of the 5 L autoclave system was replaced with nitrogen, the temperature was raised to 100° C., 122 g (2.7 mol) of ethylene oxide was added at 80 to 120° C. under a pressure of 1 MPa or less, and then the reaction was continued for another 1 hour. The toluene in the 5 L autoclave was removed under reduced pressure, the temperature was raised to 100° C., 2662 g (60.5 mol) of ethylene oxide was added at 80 to 130° C. under a pressure of 1 MPa or less, and then the reaction was continued for another 1 hour. The entire content was taken out, and the pH was adjusted to 7.5 with an 85% aqueous phosphoric acid solution to obtain the following compound (vi).

TOF-MS analytical value (centroid value of molecular weight): 43,440

As a result of NMR analysis, the vinyl ether group content in the methoxylated compound represented by the formula (vi) was 7%.

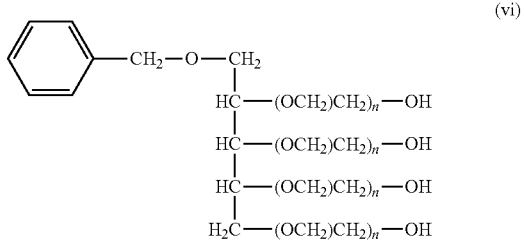

(vi)

Example 3-2

The polyethylene glycol represented by the formula (vi) (molecular weight: 40,000, vinyl ether content: 7%): 300 g and toluene: 2700 g were charged into a 10 L four-necked flask equipped with a mechanical stirring apparatus, a thermometer, and a nitrogen blowing tube and dissolved at 55° C. using a mantle heater. Thereto, 120 g of Kyoward 700 (manufactured by Kyowa Chemical Industry Co., Ltd.) dispersed in 600 g of toluene was added. After stirring at 55° C. for 2 hours under nitrogen conditions, filtration was performed and a filtrate was collected. Hexane was added to the filtrate, and precipitated crystals were collected by filtration and dried under vacuum. As a result of NMR analysis, the vinyl ether group content in the polyethylene glycol compound represented by the formula (vi) was N.D.

INDUSTRIAL APPLICABILITY

According to the present invention, a high-quality polyethylene glycol compound suitable for pharmaceutical uses can be easily provided on an industrial scale.

While the present invention has been described in detail and with reference to specific embodiments, it will be apparent to one skilled in the art that various changes and modifications can be made therein without departing from the spirit and scope of the invention.

The invention claimed is:

1. A method for producing and treating a branched polyethylene glycol containing an impurity having a vinyl ether group, the method comprising:
   reacting a compound represented by the following formula [2] with ethylene oxide in the presence of an alkaline catalyst to achieve polymerization and thereby produce a branched polyethylene glycol compound which (a) is represented by the following formula [1] and has a weight average molecular weight of 40,000 or more, and (b) contains an impurity having a vinyl ether group:

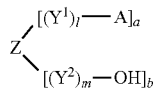

[2]

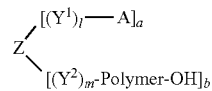

[1]

wherein in the formula [1] and the formula [2],
Z is a residue obtained by removing, from a compound having 3 to 5 active hydrogen groups, the active hydrogen groups;
$Y^1$ and $Y^2$ each independently represent an alkylene group having 1 to 12 carbon atoms;
A represents a protecting group for an active group selected from the group consisting of a hydroxyl group, a carboxyl group, an amino group, and a thiol group;
Polymer represents a polyethylene glycol chain;
l is 0 or 1;
m is 0 or 1; and
a and b are integers satisfying $1 \leq a \leq 3$, $2 \leq b \leq 4$, and $3 \leq a+b \leq 5$,
adding to the branched polyethylene glycol compound at least one solid acid selected from the group consisting of magnesium silicate, aluminum silicate, and aluminum magnesium silicate and having a specific surface area of 50 to 250 m²/g in the presence of an aprotic organic solvent to obtain a mixture;
stirring the mixture; and
subsequently separating the solid acid,
wherein the vinyl ether group of the impurity contained in the branched polyethylene glycol compound is converted into a hydroxyl group by treatment with the solid acid, and
wherein the impurity is represented by following formula (ii):

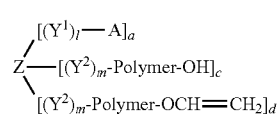

(ii)

in the formula (ii),
Z, $Y^1$, $Y^2$, A, Polymer, l, m, and a are the same as defined above and $0 \leq c \leq 3$, $1 \leq d \leq 4$ and $3 \leq a+c+d \leq 5$ are satisfied.

* * * * *